United States Patent
Lee et al.

(10) Patent No.: US 11,543,159 B2
(45) Date of Patent: Jan. 3, 2023

(54) HYBRID ADSORPTION HEAT PUMP WITH IMPROVED COOLING AND HEATING EFFICIENCY

(71) Applicant: SAMJUNG TECH CO., LTD., Seoul (KR)

(72) Inventors: Su Yong Lee, Changwon-si (KR); Sung Min Woo, Busan (KR); Kwang Young Kim, Gimpo-si (KR); Hyo Sang Kim, Seoul (KR)

(73) Assignee: SAMJUNG TECH CO., LTD., Seoul (KR)

( * ) Notice: Subject to any disclaimer, the term of this patent is extended or adjusted under 35 U.S.C. 154(b) by 0 days.

(21) Appl. No.: 17/565,062

(22) Filed: Dec. 29, 2021

(65) Prior Publication Data
US 2022/0381486 A1 Dec. 1, 2022

(30) Foreign Application Priority Data
May 28, 2021 (KR) .................. 10-2021-0069268

(51) Int. Cl.
*F25B 25/02* (2006.01)

(52) U.S. Cl.
CPC ...... *F25B 25/02* (2013.01); *F25B 2600/2507* (2013.01)

(58) Field of Classification Search
CPC ........ F25B 25/00; F25B 25/02; F25B 25/005; F25B 15/008; F25B 49/04; F25B 2600/2507; F25B 17/00; H05K 7/20363
See application file for complete search history.

(56) References Cited

U.S. PATENT DOCUMENTS

| 5,005,371 A * | 4/1991 | Yonezawa | F25B 17/08 62/480 |
| 6,314,744 B1* | 11/2001 | Ogawa | F25B 25/02 62/106 |
| 2020/0309393 A1* | 10/2020 | Bhosale | F24F 3/044 |

FOREIGN PATENT DOCUMENTS

| JP | 2005-090825 A | 4/2005 |
| JP | 2017-009173 A | 1/2017 |
| KR | 10-2018-0004947 A | 1/2018 |
| KR | 10-2018-0072368 A | 6/2018 |

OTHER PUBLICATIONS

"Notice of Allowance" Office Action issued in KR 10-2021-0069268; mailed by the Korean Intellectual Property Office dated Dec. 6, 2021.
Office Action issued in KR 10-2021-0069268; mailed by the Korean Intellectual Property Office dated Aug. 20, 2021.

* cited by examiner

*Primary Examiner* — Frantz F Jules
*Assistant Examiner* — Webeshet Mengesha
(74) *Attorney, Agent, or Firm* — Studebaker & Brackett PC

(57) ABSTRACT

The hybrid adsorption heat pump of the present invention includes an adsorption unit 100 including an adsorption evaporator 1, an adsorption condenser 2, at least two adsorption towers 3, 4, an evaporator 5, a first condenser 7, a compressor 8, an expansion and a compression type unit 200 including a valve 9 and a four-way valve 10, and the refrigerant generated in the evaporator 5 is one of the adsorption towers 3 and 4 and the It is provided in the adsorption-type condenser 2, characterized in that it is provided to the evaporator 1 of the adsorption tower during heating operation.

11 Claims, 5 Drawing Sheets

US 11,543,159 B2

HYBRID ADSORPTION HEAT PUMP WITH IMPROVED COOLING AND HEATING EFFICIENCY

CROSS-REFERENCE TO RELATED APPLICATIONS

This patent application claims priority under 35 U.S.C. § 119 to Korean Patent Application No. 10-2021-0069268, filed on May 28, 2021, in the Korean Intellectual Property Office, the disclosure of which is incorporated by reference herein in its entirety.

TECHNICAL FIELD

The present invention relates to a hybrid adsorption type heat pump with improved cooling and heating efficiency. More particularly, it relates to a hybrid adsorption type heat pump with improved cooling and heating efficiency that does not require a separate cooling facility.

DISCUSSION OF RELATED ART

Existing adsorption system requires a separate cooling tower facility in the process of adsorption and condensation. In particular, the disadvantage of low efficiency has been pointed out because cooling water of about 30-32 degrees must be used for cooling in summer.

In general, the lower the cooling water temperature, the higher the self-cooling coefficient of performance (COP) of the adsorption system. In addition, in the case of an adsorption type system, there is a limit in itself to be driven as a heat pump cycle that absorbs low-temperature heat due to the cycle principle.

In the compression type system, a water cooling type or an air cooling type using a cooling tower can be used for cooling. This also has the disadvantage that a lot of power must be consumed in order to make cold water of 7° C., the domestic standard.

In the heating with the compression system, heat pump technology that absorbs low-temperature outdoor air heat has been developed, but a large amount of power is used to absorb −5° C.~−10° C. external air heat and make it a heating temperature of 45~50° C. The disadvantages of the large amount power consumption have been pointed out. In particular, it is very difficult to make a heating temperature at an outside temperature of −15° C. or less in the cold season, so securing the reliability of the performance has been a problem.

SUMMARY

The hybrid adsorption heat pump of the present invention includes an adsorption type unit 100 including an adsorption type evaporator 1, an adsorption type condenser 2, and at least two or more adsorption towers 3, 4, an evaporator 5, a first condenser 7, a compressor 8, an expansion valve 9 and a compression type unit 200 including a four-way valve 10, Hot and cold water generated in the evaporator 5 is provided to one of the adsorption towers and the adsorption condenser 2 of the adsorption towers 3 and 4 during cooling operation, and is provided to the evaporator 1 of the adsorption tower during heating operation.

In one embodiment, the first inlet pipe IN1 selectively connected to the adsorption evaporator 1 or at least two or more adsorption towers 3, 4, and It may be characterized by further comprising a first outlet pipe OUT1 selectively connected to the adsorption type condenser 2 or the adsorption type evaporator 1.

In one embodiment, the first inlet pipe IN1 may be characterized in that it is connected to the adsorption type evaporator 1 when cooling is driven, and connected to two or more adsorption towers 3, 4 when heating is driven.

In one embodiment, the first outlet pipe OUT1 may be connected to the adsorption type evaporator 1 when cooling is driven, and connected to the adsorption type condenser 2 when heating is driven.

In one embodiment, the first outlet pipe OUT1, the first pipe P1 connected to the adsorption type condenser 2, and the second pipe P2 connected to the adsorption type evaporator 1 are respectively connected to the first three-way The valve V1, and the first inlet pipe IN1, the third pipe P3 connected to the adsorption evaporator 1, and the fourth pipe P4 connected to the adsorption towers 3 and 4, respectively. It may be characterized by further comprising a three-way valve V2.

In one embodiment, connected to the evaporator 5 and connected to the sixth inlet pipe P6IN selectively connected to the adsorption evaporator 1 or the adsorption condenser 2, and connected to the evaporator 5, the adsorption evaporator 1 or it may further include a sixth outlet pipe P6OUT selectively connected to at least two or more adsorption towers 3, 4.

In one embodiment, the sixth inlet pipe P6IN may be connected to the adsorption-type condenser 2 when cooling is driven, and connected to the adsorption-type evaporator 1 when heating is driven.

In one embodiment, the sixth outlet pipe P6OUT may be connected to at least two or more adsorption towers 3 and 4 when cooling is driven, and connected to the adsorption evaporator 1 when heating is driven.

In one embodiment, the sixth outlet pipe P6OUT, the seventh pipe P7 connected to the adsorption type evaporator 1, and the third pipe P8 connected to the eighth pipe P8 connected to the adsorption tower 3, 4, respectively The three-way valve V3 and the sixth inlet pipe P6IN, the ninth pipe P9 connected to the adsorption evaporator 1, and the fourth pipe P10 connected to the adsorption condenser 2 are respectively connected Hybrid adsorption heat pump, characterized in that it further comprises a three-way valve V4.

In one embodiment, it may be characterized in that it further includes a second condenser 6 and a third inlet pipe IN3 and a third outlet pipe OUT3 connected to the second condenser.

In one embodiment, the adsorption towers 3 and 4 include a first adsorption tower 3 and a second adsorption tower 4, and a second inlet pipe connected to the first and second adsorption towers 3 and 4, respectively IN2 and a second outlet pipe OUT2 may be further included.

In one embodiment, the second inlet pipe IN2 and the second outlet pipe OUT2, the eighth pipe P8 connected from the evaporator 5 side, and the fifth pipe connected to the adsorption condenser 2 side P5 may be characterized in that the first and third adsorption towers 3, 4 and cross-connected with each other, respectively.

In one embodiment, a first four-way valve VV1 connecting the first and second adsorption towers 3, 4, the second inlet pipe IN2, and the fifth pipe P5, and the first and a second four-way valve VV2 connecting the second adsorption towers 3, 4, the second outlet pipe OUT2, and the eighth pipe P8.

In one embodiment, the compressive unit 200 further comprises a second condenser 6, The first condenser 7 and the second condenser 6 may be characterized in that the amount of condensed in each condenser is allocated according to the load required for the second condenser 6.

In one embodiment, further comprising a fan 11 for condensing the first condenser 7, According to the amount of condensation required by the second condenser 6, it may be characterized in that the rotation speed of the fan 11 condensing the first condenser 7 is controlled.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
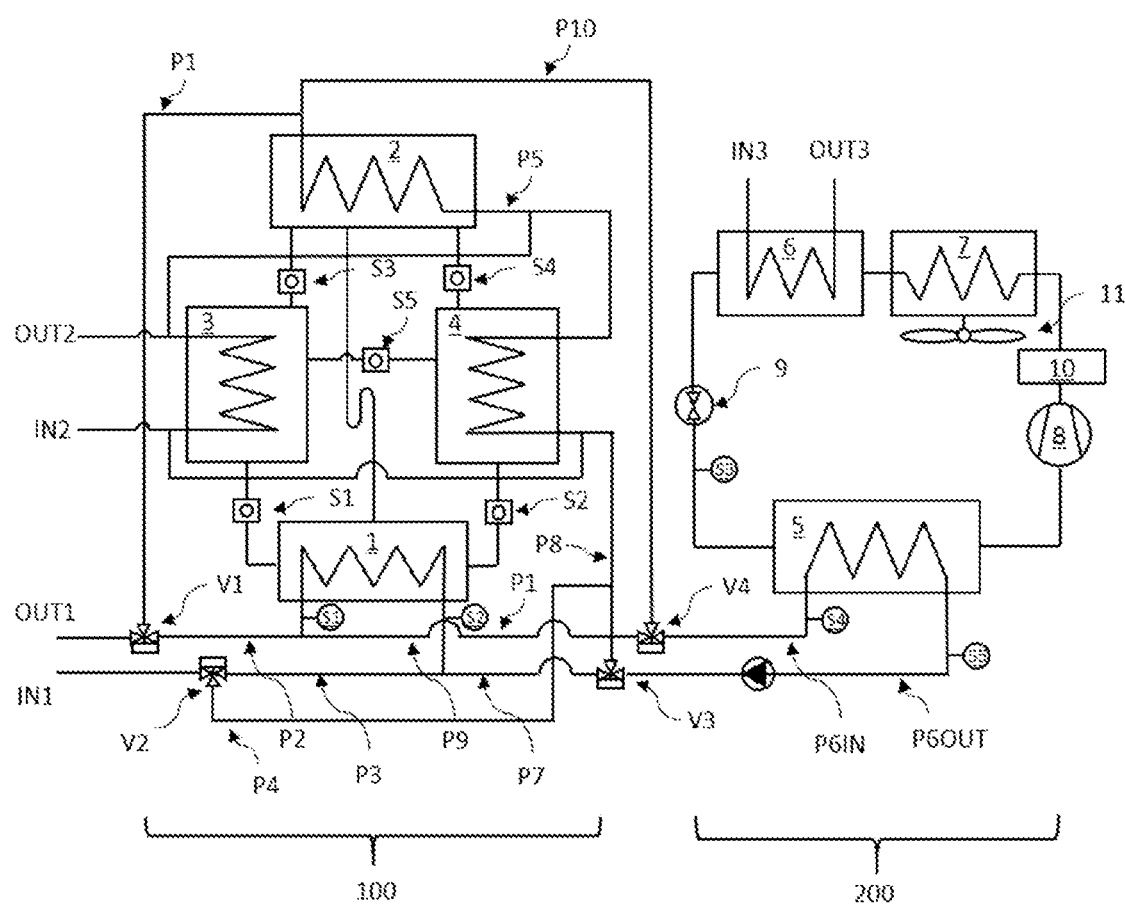
FIG. 1 is a conceptual diagram illustrating a high-efficiency hybrid adsorption type heat pump according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended requests. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof, mean "including, but not limited to". The term "coupled." means "directly or indirectly connected".

The singular expressions include plural expressions unless the context clearly dictates otherwise.

It will be apparent to those skilled in the art that the present invention may be embodied in other specific forms without departing from the essential characteristics thereof.

Hereinafter, embodiments of the present invention will be described in detail with reference to the drawings. In the figs, same reference numerals refer to same elements.

Operating Principle of High-Efficiency Hybrid Adsorption Heat Pump

The present invention can be configured by combining the compression unit 200 to the adsorption unit 100, omitting a separate cooling facility required for the existing adsorption unit. The heat pump of the present invention efficiently operates heating and cooling by using together efficiently unused low-temperature heat sources IN2, OUT2 provided as hot water at 70° C. or less and the air heat source 11.

During the cooling operation, by combining the adsorption type unit 100 and the compression type unit 200, high-efficiency cooling is supplied. At the same time, It is possible to supply hot water (IN3, OUT3). In order to improve efficiency during cooling operation, the compression unit produces cold water at about 20-30° C. The cold water is supplied as cooling water to the adsorption-type condenser (2) and the adsorption tower in the adsorption process among the adsorption towers (3, 4). At this time, cold water of 7° C. can be obtained from the adsorption type evaporator 1, and at the same time, hot water or heating water IN3 and OUT3 of about 45 to 60° C. level can be obtained from the compression type second condenser 6.

During the heating operation, it is driven by a heat pump cycle using the low-temperature air heat source 11 and the unused low-temperature heat sources IN2 and OUT2, so that heating efficiency can be greatly improved. In particular, during heating operation, when the compression type absorbs low-temperature air heat (11) and produces hot water of about 20-30° C. and supplies it to the evaporator (1) of the adsorption type unit, the heat quantity is recovered from the compression type hot water and the hot water supplied to the adsorption tower. It is a heat pump cycle that produces heating and hot water at about 40-50° C. in the adsorption towers 3 and 4 and the adsorption type condenser 2, and supplies heating (IN1, OUT1) to the consumers with very high efficiency.

Therefore, the present invention is a hybrid adsorption heat pump capable of achieving very high efficiency in both heating and cooling periods by recovering or discharging heat from the unused low-temperature heat sources IN2, OUT2 and the air heat source 11 while minimizing the power of the compression unit 200. The hybrid adsorption heat pump of the present invention is characterized in that the adsorption-type and compression-type devices are combined.

Basic Composition of High-Efficiency Hybrid Adsorption Heat Pump

FIG. 1 is a conceptual diagram illustrating a high-efficiency hybrid adsorption type heat pump according to an embodiment of the present invention.

Referring to FIG. 1, the high-efficiency hybrid adsorption heat pump according to an embodiment of the present invention is divided into an adsorption type unit 100 and a compression type unit 200. Specifically, the heat pump includes an adsorption type evaporator 1, an adsorption condenser 2, a first adsorption tower 3, a second adsorption tower 4 which are an adsorption type unit 100, and an evaporator 5, a first condenser 7, a second condenser 6, a compressor 8, an expansion valve 9, and a four-way valve 10 which are a compression unit 200. The first condenser 7 may include an air-cooled cooling unit 11 separately. The second condenser 6 corresponds to a hot water supply or a heating heat exchanger.

The first inlet pipe IN1 and the first outlet pipe OUT1, the second inlet pipe IN2 and the second outlet pipe OUT2, and the third inlet pipe IN3 and the third outlet pipes OUT3 are included. The first to tenth pipes P1, . . . , P10 constituting the inside are included. In addition, the first to fourth three-way valves V1, V2, V3, V4 are included. The adsorption tower 3, 4 of the adsorption unit 100 includes, respectively, the first to fifth switches S1, S2, S3, S4, S5. In addition, each part temperature sensor S1, S2, S3, S4, S5 is included, a cooling heat source circulation pump PUMP between the adsorption type and the compression type is included.

In the first inlet pipe IN1 and the first outlet pipe OUT1, when cooling is driven, cold water for cooling flows in and flows out after cooling, and when heating is driven, hot water for heating flows in and is heated to high temperature and flows out.

In the second inlet pipe IN2 and the second inlet pipe OUT2, unused low-temperature hot water is commonly supplied during cooling and heating, and this is used as a heat source for operating a cooling and heating cycle.

In the third inlet pipe IN3 and the third outlet pipe OUT3, hot water used for separate hot water supply or heating flows in during cooling operation, and is heated to a high temperature and flows out.

The first pipe P1 connects the first outlet pipe OUT1 and the adsorption type condenser 2. The second pipe P2 connects the adsorption type evaporator 1 and the first outlet pipe OUT1. The first three-way valve V1 connects the first pipe P1, the second pipe P2, and the first outlet pipe OUT1. The third pipe P3 is connected to the first inlet pipe IN1 and the adsorption type evaporator 1.

The fourth pipe P4 is connected to the adsorption towers 3 and 4 and the first inlet pipe IN1. The second three-way valve V2 is connected to the first inlet pipe IN1, the third pipe P3 and the fourth pipe P4. Accordingly, the flow path can be controlled through the control of the first three-way valve V1 and the second three-way valve V2.

The seventh pipe P7 is connected to the sixth outlet pipe P6OUT and the adsorption type evaporator 1. The eighth pipe P8 is connected to the sixth outlet pipe P6OUT and the adsorption towers 3 and 4. The third three-way valve V3 is connected to the seventh pipe P7, the eighth pipe P8, and the sixth outlet pipe P6OUT.

The ninth pipe P9 is connected to the sixth inlet pipe P6IN and the adsorption type evaporator 1. The tenth pipe (P10) is connected to the sixth inlet pipe P6IN and the adsorption type condenser 2. The fourth three-way valve V4 is connected to the ninth pipe P9 and the tenth pipe P10 and the sixth inlet pipe P6IN. Accordingly, it is possible to control the flow path of the cold and hot water generated in the evaporator 2 through the control of the third and fourth three-way valves V3, V4.

The first to fourth three-way valves V1, V2, V3, V4 are each driven to form a flow path during cooling and heating driving, respectively, to form a flow path, and to the adsorption tower 3, 4 of the adsorption type unit (100) The disposed first to fifth switches S1, S2, S3, S4, S5 are controlled so that in the adsorption unit 100, two or more adsorption towers 3, 4 can start an adsorption/desorption cycle, respectively.

In addition, each temperature sensor S1, S2, S4, S5 is used for controlling the cooling or heating temperature, and the third temperature sensor S3 included in the cycle in the compression type unit is used for hot water supply or heating load at the time of cooling start. Accordingly, it can be used for air-cooled load control 11.

On the other hand, various adsorbents such as silica gel, zeolite, and organic/inorganic composite adsorbent MOF can be applied as an adsorption type adsorbent. Low GWP new refrigerants such as R1234yf are also included.

Cooling Operation of Hybrid Adsorption Heat Pump

Figure 2:
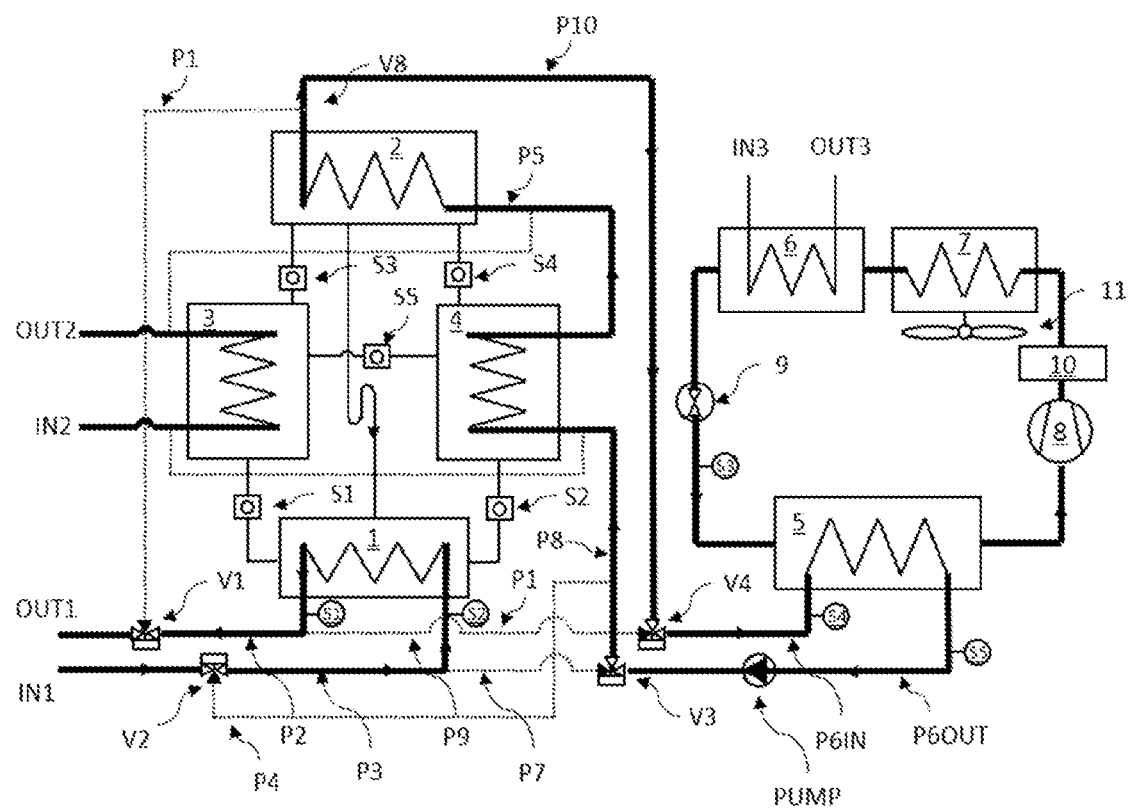
FIG. 2 is a conceptual diagram illustrating cooling operating of the high-efficiency hybrid adsorption type heat pump according to the embodiment of FIG. 1.

FIG. 2 is a conceptual diagram illustrating cooling operating of the high-efficiency hybrid adsorption type heat pump according to the embodiment of FIG. 1.

In the hybrid adsorption heat pump according to this embodiment, when the cooling operation command of the system is started, the first three-way valve V1 and the second three-way valve V2 circulate the flow path to the evaporator 1 of the adsorption type unit 200 Adjust the opening. At this time, the flowing cold water is provided to the adsorption type evaporator 1 from the indoor load side through the first inlet pipe IN1 and the first outlet pipe OUT1, respectively, and is circulated again.

On the other hand, hot water, which is an unused heat source, is supplied to the first adsorption tower 3 in which the desorption process is performed among the first and second adsorption towers 3 and 4, and desorption proceeds. At this time, hot water, which is an external unused heat source, is supplied through the second inlet pipe IN2 and the second outlet pipe OUT2.

In the other second adsorption tower 4, cold water of about 20 to 30° C. made in the compression type unit is used as cooling water, and this cooling water is circulated to the second adsorption tower 4 and the adsorption type condenser 2. At this time, in the adsorption unit, the adsorption evaporator 1 finally produces cold water of 7° C. The produced cold water is discharged through the first outlet pipe OUT1 and is supplied to the indoor load side to perform cooling.

At this time, the heat amount of the unused heat source hot water absorbed into the adsorption unit 100 through the second inlet pipe IN2 and the cold heat absorbed from the indoor load side through the first inlet pipe IN1 are the adsorption towers 3 and 4 and the adsorption condenser 2 is delivered to the cooling water from the compression evaporator 5 at a level of about 25~35° C. At this time, the third and fourth three-way valves V3, V4 control the flow path to form a flow path so that the cooling water is provided from the adsorption type condenser 2 to the compression type evaporator 5 through the adsorption towers 3, 4. In the compression unit 200, using the transferred cooling heat, the temperature of the refrigerant circulated in the compression type is raised and vaporized, and this is made into a high-temperature and high-pressure gas in the compressor 8 to the first condenser 7 and is supplied to the second condenser 6.

The first condenser 7 may be treated 11 by air cooling, and hot water is introduced in the second condenser 6 through the third inlet pipe IN3 and the third outlet pipe OUT3 to the hot water supply or heating heat exchanger. It is then heated and discharged.

At this time, when a hot water supply load or a heating load occurs, the second condenser 6 is preferentially started to provide a hot water supply load or a heating load, and the degree of subcooling is improved. If the hot water supply or heating load is small or there is no load, the fan 11 is started in the first condenser 7 to condense it, and then it is supplied to the evaporator through the expansion valve 9 to repeat the cycle. At this time, the air-cooling operating control of the first condenser 7 can automatically calculate the scale and supercooling degree of hot water supply or heating load, and control the fan 11 by ON/OFF or step control, inverter control, etc.

As such, during cooling, hot water or heating water can be supplied from the compression unit at the same time as high-efficiency adsorption cooling, so that very good performance in terms of energy efficiency can be secured.

In addition, at the time of partial load, power is saved by controlling the output of the compressor of the compression unit with the inverter, and at the same time, the use of an unused heat source, which is an external heat source, is reduced, and thus more energy is saved.

In addition, since the hybrid adsorption heat pump does not require a cooling water facility, the initial investment cost, which is the biggest obstacle for an adsorption system using an unused low-temperature heat source, can be greatly reduced, which can greatly contribute to energy supply and demand and utilization.

Heating Operation of Hybrid Adsorption Heat Pump

Figure 3:
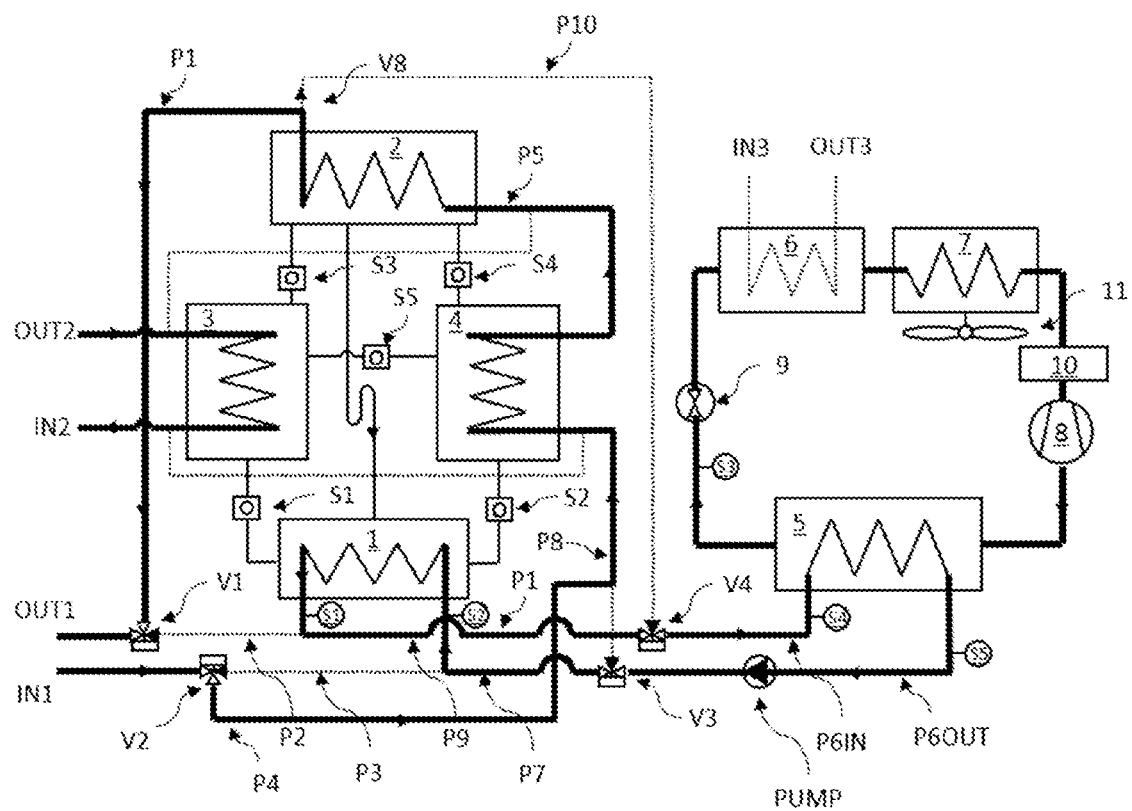
FIG. 3 is a conceptual diagram illustrating a heating operation of the high-efficiency hybrid adsorption type heat pump according to the embodiment of FIG. 1.

FIG. 3 is a conceptual diagram illustrating a heating operation of the high-efficiency hybrid adsorption type heat pump according to the embodiment of FIG. 1.

In the hybrid adsorption heat pump according to this embodiment, when the heating operation command of the system is started, the first three-way valve V1 and the second three-way valve V2. are adjusted to direct the flow path to the opening degree to circulate to the adsorption tower 3, 4 and adsorption type condenser 2 of the adsorption type unit 100. The heated hot water flowing in/out through the first inlet pipe IN1 and the first outlet pipe OUT1 is circulated from the indoor load side to the adsorption towers 3 and 4 and the adsorption condenser 2.

At this time, the third three-way valve V3 and the fourth three-way valve V4 form a flow path so that the compression evaporator 5 of the compression unit 200 and the adsorption evaporator 1 of the adsorption unit 100 communicate with each other. The cycle of the compression type unit 200 is started in the reverse direction by the four-way valve 10 in the compression type unit 200, and the refrigerant flows in the reverse direction. The first condenser 7 of the compression unit 200 serves as an evaporator that absorbs heat from an external low-temperature air heat source, and then the refrigerant is condensed in the evaporator 5 of the compression unit in a state of increased pressure and temperature in the compressor. do. At this time, the external low-temperature air heat source applied to the first condenser 7 may have a temperature of about 5° C. to −15° C. based on winter.

At this time, the evaporator 5 of the compression unit 200 produces low-temperature hot water of about 20-30° C. and circulates it to the adsorption evaporator 1 of the adsorption unit 100. The adsorption type evaporator 1 absorbs heat from low-temperature hot water of 20~30° C., and according to desorption and adsorption, it uses the adsorption tower 3, 4 and the adsorption type condenser 2 together with the external unused hot water heat for heating hot water at about 45~55° C. The hybrid adsorption heating heat pump cycle is driven by dissipating heat in the form of heat.

At this time, the second condenser 6 is automatically stopped. In addition, the output of the compression unit 200 is controlled by the inverter according to the load factor of the indoor demand, the control of the fan 11 of the first condenser 7 is made, and the hot water heat input IN2, OUT2 of the adsorption type unit 100 is controlled, and the efficiency is further increased during partial load.

Unlike conventional adsorption or compression heat pumps, in this technology, three types of heat and work are created with hot water: low-temperature air heat using compression, the amount of heat corresponding to the compression day, and heat input by adsorption. The heating efficiency is excellent.

In addition, it is possible to completely compensate for the lack of reliability and stability of heating performance in the cold season, which is the biggest disadvantage of the compression type heat pump, so that it is possible to provide high-efficiency and stable heating and cooling water supply in four seasons.

Additional Examples of Hybrid Adsorption Heat Pumps

Figure 4:
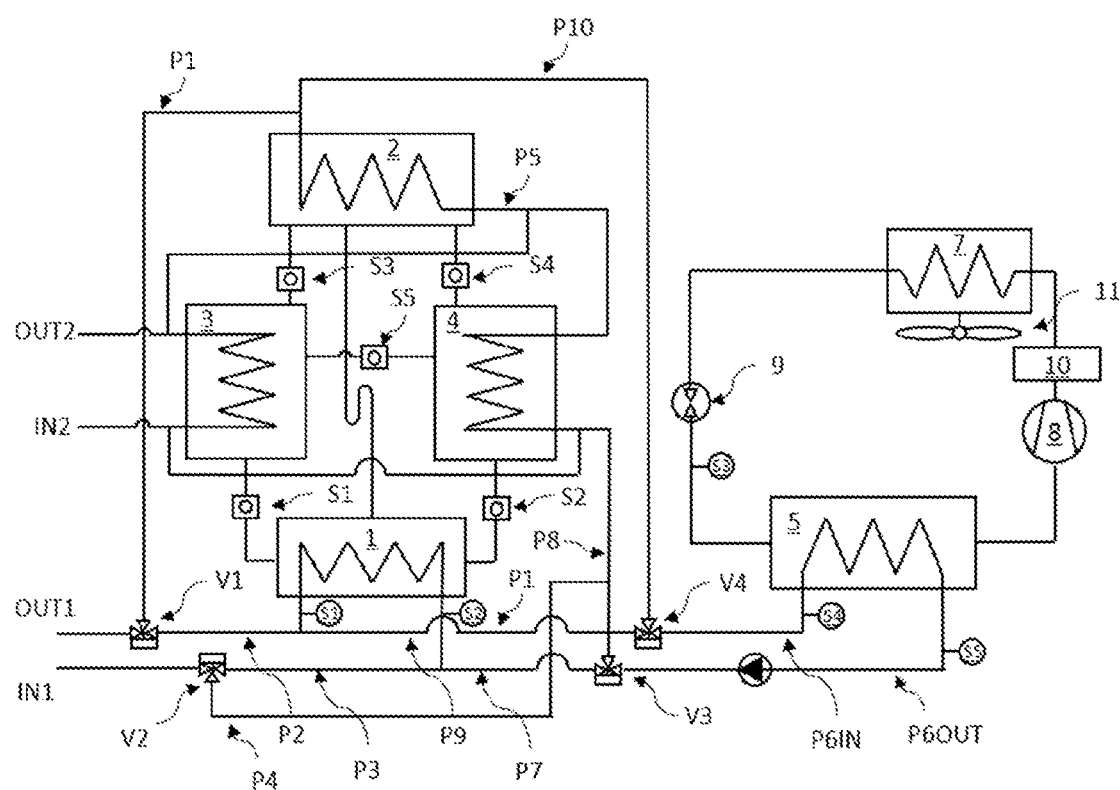
FIG. 4 is a conceptual diagram illustrating a high-efficiency hybrid adsorption type heat pump according to another embodiment of the present invention.

FIG. 4 is a conceptual diagram illustrating a high-efficiency hybrid adsorption type heat pump according to another embodiment of the present invention.

Referring to FIG. 4, compared with the embodiment of FIG. 1, the compression type unit 200 is configured to omit the second condenser 6. In this case, it is impossible to separately provide hot water or hot water for heating during cooling operation, but since it is possible to control the first condenser 7 through the fan 11, the second condenser 6 is omitted when only the cooling function is required. can be configured.

Figure 5:
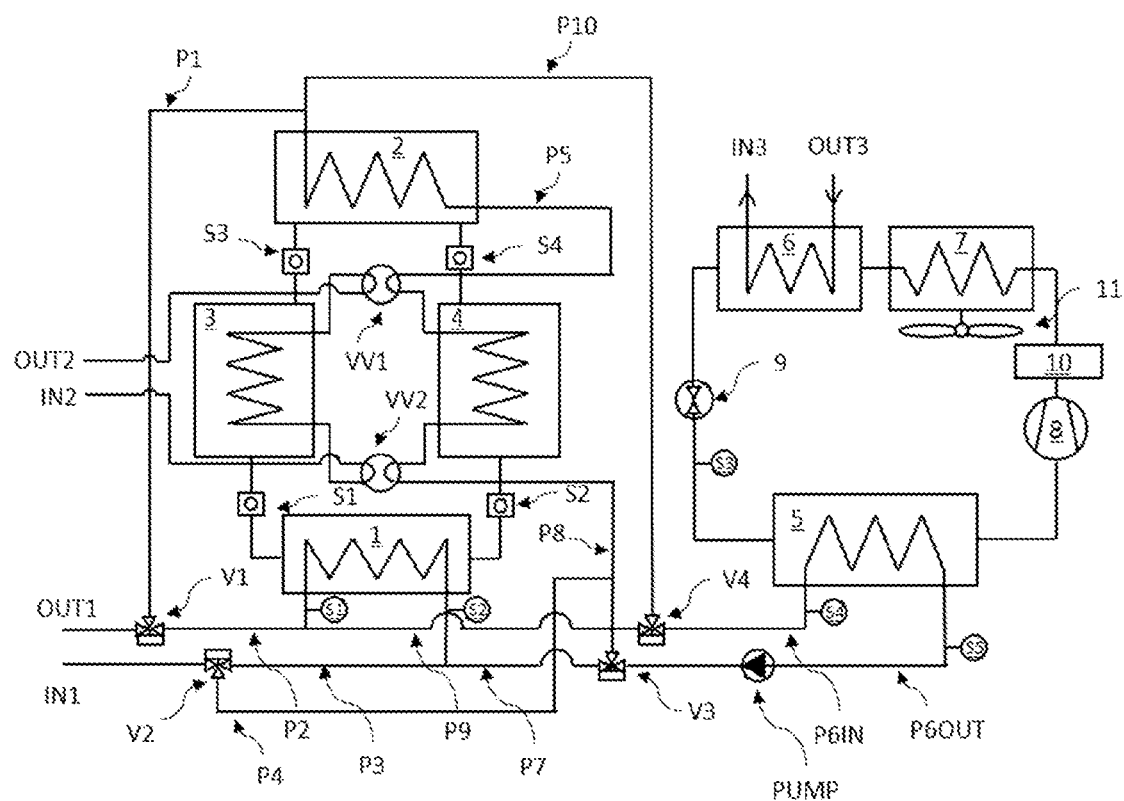
FIG. 5 is a conceptual diagram illustrating a high-efficiency hybrid adsorption heat pump according to another embodiment of the present invention.

FIG. 5 is a conceptual diagram illustrating a high-efficiency hybrid adsorption heat pump according to another embodiment of the present invention.

Referring to FIG. 5, compared with the embodiment of FIG. 1, a second inlet pipe IN2, a second outlet pipe OUT2 and an eighth pipe P8 and the fifth pipe P5 connected to the first and second adsorption towers 3 and 4. were composed of the first four-way valve VV1 and the second four-way valve VV2, respectively.

When the first and second adsorption towers 3 and 4 are alternately driven in the adsorption and desorption processes, respectively, the first and second four-way valves (VV1, VV2) are installed in the adsorption unit 100 to facilitate switching them, more easily adsorption-desorption conversion becomes possible.

As such, although the present invention has been described in relation to the above-mentioned preferred embodiment, cold water is produced by using the cold water produced in the compression type as an adsorption cooling water without a cooling water facility during cooling, and an air heat source and a compression type during heating, Those skilled in the art will readily recognize that various modifications and variations are possible without departing from the gist and scope of the heat pump cycle using three or more heat sources such as unused heat sources.

One embodiment of the present invention described above is merely exemplary, and those of ordinary skill in the art to which the present invention pertains will appreciate that various modifications and equivalent other embodiments are possible therefrom. Therefore, it will be well understood that the present invention is not limited to the form mentioned in the above detailed description. Therefore, the true technical protection scope of the present invention should be determined by the technical spirit of the appended claims. Moreover, it is to be understood that the present invention covers all modifications, equivalents and substitutions falling within the spirit and scope of the invention as defined by the appended claims.

What is claimed:

1. A hybrid adsorption heat pump comprising:
   an adsorption unit 100 including an adsorption evaporator 1, an adsorption condenser 2, and at least two or more adsorption towers 3, 4;
   a compression unit 200 including an evaporator 5, a first condenser 7, a compressor 8, an expansion valve 9 and a four-way valve 10;
   a first inlet pipe IN1 selectively connected to the adsorption evaporator 1 or at least two or more the adsorption towers 3, 4; and
   a first outlet pipe OUT1 selectively connected to the adsorption condenser 2 or the adsorption evaporator 1,
   wherein cold and hot water generated in the evaporator 5 is provided to one of the adsorption towers 3, 4 and the adsorption condenser 2 during cooling operation, and is provided to the adsorption evaporator 1 during heating operation, wherein during cooling operation of the hybrid adsorption heat pump, the first inlet pipe IN1 is controlled by a second three-way valve V2 to have a direct connection with the adsorption evaporator 1 and to have no direct connection with the two or more adsorption towers 3, 4, and wherein during heating operation of the hybrid adsorption heat pump, the first inlet pipe IN 1 is controlled by the second three-way valve V2 to have a direct connection with the two or more adsorption towers 3, 4 and to have no direct connection with the adsorption evaporator 1.

2. The hybrid adsorption heat pump according to claim 1, wherein during the cooling operation of the hybrid adsorption heat pump, the first outlet pipe OUT1 is controlled by a first three-way valve V1 to have a direct connection with the adsorption evaporator 1 and to have no direct connection with the adsorption condenser 2, and wherein during heating operation of the hybrid adsorption heat pump, the first outlet pipe OUT1 is controlled by the first three-way valve V1 to have a direct connection with the adsorption condenser 2 and to have no direct connection with the adsorption evaporator 1.

3. The hybrid adsorption heat pump according to claim 2, wherein:
the first three-way valve V1 is respectively connected to the first outlet pipe OUT1, a first pipe P1 connected to the adsorption condenser 2, and a second pipe P2 connected to the adsorption evaporator 1; and
the second three-way valve V2 is respectively connected to the first inlet pipe IN1, a third pipe P3 connected to the adsorption evaporator 1 and a fourth pipe P4 connected to the adsorption towers 3 and 4.

4. A hybrid adsorption heat pump comprising:
an adsorption unit 100 including an adsorption evaporator 1, an adsorption condenser 2, and at least two or more adsorption towers 3, 4;
a compression unit 200 including an evaporator 5, a first condenser 7, a compressor 8, an expansion valve 9 and a four-way valve 10;
a sixth inlet pipe P6IN connected to the evaporator 5 and selectively connected to the adsorption evaporator 1 or the adsorption condenser 2; and
a sixth outlet pipe P6OUT connected to the evaporator 5 and selectively connected to the adsorption evaporator 1 or at least two or more of the adsorption towers 3, 4,
wherein cold and hot water generated in the evaporator 5 is provided to one of the adsorption towers 3, 4 and the adsorption condenser 2 during cooling operation, and provided to the adsorption evaporator 1 during heating operation,
wherein during cooling operation of the hybrid adsorption heat pump, the sixth inlet pipe P6IN is controlled by a fourth three-way valve V4 to have a direct connection with the adsorption condenser 2 and to have no direct connection with the adsorption evaporator 1, and
wherein during heating operation of the hybrid adsorption heat pump, the sixth inlet pipe P6IN is controlled by the fourth three-way valve V4 to have a direct connection with the adsorption evaporator and to have no direct connection with the adsorption condenser 2.

5. A hybrid adsorption heat pump comprising:
an adsorption unit 100 comprising an adsorption evaporator 1, an adsorption condenser 2, and at least two or more adsorption towers 3, 4;
a compression unit 200 including an evaporator 5, a first condenser 7, a compressor 8, an expansion valve 9 and a four-way valve 10;
a sixth inlet pipe P6IN connected to the evaporator 5 and selectively connected to the adsorption evaporator 1 or the adsorption condenser 2; and
a sixth outlet pipe P6OUT connected to the evaporator 5 and selectively connected to the adsorption evaporator 1 or at least two or more of the adsorption towers 3, 4,
wherein cold and hot water generated in the evaporator 5 is provided to one of the adsorption towers 3, 4 and the adsorption condenser 2 during cooling operation, and provided to the adsorption evaporator 1 during heating operation, and
wherein during cooling operation of the hybrid adsorption heat pump, the sixth outlet pipe P6OUT is controlled by a third three-way valve V3 to have a direct connection with at least two or more of the adsorption towers 3, 4 and to have no direct connection with the adsorption evaporator 1, and
wherein during heating operation of the hybrid adsorption heat pump, the sixth outlet pipe P6OUT is controlled by the third three-way valve V3 to have a direct connection with the adsorption evaporator 1 and to have no direct connection with the at least two or more of the adsorption towers 3, 4.

6. The hybrid adsorption heat pump according to claim 4, further comprising:
a third three-way valve V3 respectively connected to the sixth outlet pipe P6OUT, a seventh pipe P7 connected to the adsorption evaporator 1 and an eighth pipe P8 connected to the adsorption towers 3, 4,
wherein the fourth three-way valve V4 is respectively connected to the sixth inlet pipe P6IN, a ninth pipe P9 connected to the adsorption type-evaporator 1 and a tenth pipe P10 connected to the adsorption condenser 2.

7. The hybrid adsorption heat pump according to claim 1, further comprising:
a second condenser 6; and
a third inlet pipe IN3 and a third outlet pipe OUT3 connected to the second condenser.

8. The hybrid adsorption heat pump according to claim 1, wherein the adsorption towers 3, 4 include a first adsorption tower 3 and a second adsorption tower 4,
wherein the hybrid adsorption heat pump further includes a second inlet pipe IN2 and a second outlet pipe OUT2 respectively connected to the first and second adsorption towers 3, 4.

9. The hybrid adsorption heat pump according to claim 8, wherein the second inlet pipe IN2 and the second outlet pipe OUT2, an eighth pipe P8 connected from the evaporator 5, and a fifth pipe P5 connected to the adsorption condenser 2 is respectively cross-connected to the first and second adsorption towers 3, 4.

10. The hybrid adsorption heat pump according to claim 1,
wherein the compression unit 200 further includes a second condenser 6,
wherein amounts of condensing for the first condenser 7 and the second condenser 6 are allocated according to a load required by the second condenser 6.

11. The hybrid adsorption heat pump according to claim 5, further comprising:
a fourth three-way valve V4 is respectively connected to the sixth inlet pipe P6IN, a ninth pipe P9 connected to the adsorption evaporator 1 and a tenth pipe P10 connected to the adsorption condenser 2, and wherein the third three-way valve V3 is respectively connected to the sixth outlet pipe P6OUT, a seventh pipe P7 connected to the adsorption evaporator 1 and an eighth pipe P8 connected to the adsorption towers 3, 4.

* * * * *